United States Patent
Lindgren et al.

(10) Patent No.: US 9,641,215 B2
(45) Date of Patent: May 2, 2017

(54) LEAKAGE CANCELLATION FOR A MULTIPLE-INPUT MULTIPLE-OUTPUT TRANSCEIVER

(71) Applicant: Telefonaktiebolaget L M Ericsson (publ), Stockholm (SE)

(72) Inventors: Robert Lindgren, Västra Frölunda (SE); Per-Arne Thorsén, Öjersjö (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 14/897,112

(22) PCT Filed: Aug. 30, 2013

(86) PCT No.: PCT/EP2013/068025
§ 371 (c)(1),
(2) Date: Dec. 9, 2015

(87) PCT Pub. No.: WO2014/202156
PCT Pub. Date: Dec. 24, 2014

(65) Prior Publication Data
US 2016/0119018 A1    Apr. 28, 2016

(30) Foreign Application Priority Data

Jun. 18, 2013 (WO) ............... PCT/EP2013/062602
Jun. 18, 2013 (WO) ............... PCT/EP2013/062608

(51) Int. Cl.
*H04B 1/40* (2015.01)
*H04B 1/52* (2015.01)
(Continued)

(52) U.S. Cl.
CPC ............ *H04B 1/52* (2013.01); *H04B 7/0413* (2013.01); *H04B 7/0613* (2013.01);
(Continued)

(58) Field of Classification Search
USPC ...... 375/219, 144, 267; 455/296, 63.1, 67.11
See application file for complete search history.

(56) References Cited

U.S. PATENT DOCUMENTS 5,691,978 A    11/1997    Kenworthy
8,135,348 B2 *  3/2012    Aparin .............. H04B 1/525
                                                    455/296

(Continued)

FOREIGN PATENT DOCUMENTS

EP        2148480 A2      1/2010
WO     2007137229 A2     11/2007

(Continued)

OTHER PUBLICATIONS

Choi, J., et al. "Achieving Single Channel, Full Duplex Wireless Communication", Proceedings of the Annual International Conference on Mobile Computing and Networking, MOBICOM—MOBICOM'10 and MOBIHOC'10—Proceedings of the 16th Annual International Conference on Mobile Computing and Networking and 11th ACM International Symposium, Sep. 20, 2010, pp. 1-12, XP002696691.

(Continued)

*Primary Examiner* — Eva Puente
(74) *Attorney, Agent, or Firm* — Rothwell, Figg, Ernst & Manbeck, P.C.

(57) ABSTRACT

A transceiver arrangement (200) for a fixed point-to-point radio link. The transceiver arrangement (200) comprising a transceiver (215) connected to a first antenna (210) and to a second antenna (220). The transceiver (215) being arranged to transmit a first transmit signal (211) via the first antenna (210) in a first frequency band (f1), the transceiver (215) also being arranged to receive a first receive signal (212) via the first antenna (210) in a second frequency band (f2), the transceiver (215) further being arranged to transmit a second transmit signal (221) via the second antenna (220) in the (Continued)

second frequency band (f2), the transceiver (215) also being arranged to receive a second receive signal (222) via the second antenna (220) in the first frequency band (f1).

20 Claims, 10 Drawing Sheets (51) Int. Cl.
*H04B 7/06* (2006.01)
*H04B 7/08* (2006.01)
*H04B 7/10* (2017.01)
*H04B 7/12* (2006.01)
*H04B 7/0413* (2017.01)

(52) U.S. Cl.
CPC ............. *H04B 7/0837* (2013.01); *H04B 7/10* (2013.01); *H04B 7/12* (2013.01)

(56) References Cited

U.S. PATENT DOCUMENTS

| | | | |
|---|---|---|---|
| 8,139,670 B1* | 3/2012 | Son | H04B 7/0413 370/334 |
| 8,175,535 B2* | 5/2012 | Mu | H04B 1/123 455/283 |
| 8,422,540 B1 | 4/2013 | Negus et al. | |
| 8,638,839 B2* | 1/2014 | Negus | H04B 1/38 370/210 |
| 9,281,979 B2* | 3/2016 | Maltsev | H04B 7/0408 |
| 2003/0161419 A1 | 8/2003 | Bach et al. | |
| 2004/0014449 A1* | 1/2004 | Adachi | H04B 1/525 455/296 |
| 2005/0107051 A1 | 5/2005 | Aparin et al. | |
| 2006/0040620 A1 | 2/2006 | Jung et al. | |
| 2006/0105730 A1 | 5/2006 | Modonesi et al. | |
| 2009/0296846 A1* | 12/2009 | Maru | H04B 7/0413 375/267 |
| 2010/0150032 A1 | 6/2010 | Zinser et al. | |
| 2011/0075708 A1* | 3/2011 | Hahm | H04B 1/71072 375/144 |
| 2011/0134810 A1 | 6/2011 | Yamamoto et al. | |
| 2012/0094617 A1 | 4/2012 | Tone et al. | |
| 2012/0163245 A1 | 6/2012 | Tone et al. | |
| 2012/0182906 A1 | 7/2012 | Knox | |
| 2012/0201153 A1 | 8/2012 | Bharadia et al. | |
| 2013/0128936 A1 | 5/2013 | Kennard et al. | |
| 2013/0309976 A1* | 11/2013 | Koren | H04B 7/0473 455/63.4 |
| 2015/0214633 A1* | 7/2015 | Pan | H01Q 1/20 342/372 |

FOREIGN PATENT DOCUMENTS

| | | |
|---|---|---|
| WO | 2008048534 A1 | 4/2008 |
| WO | 2008105742 A1 | 9/2008 |

OTHER PUBLICATIONS

International Search Report and Written Opinion issued on Dec. 6, 2013 in International application No. PCT/EP2013/062602, 12 pages.

International Preliminary Report on Patentability issued on Dec. 22, 2015 in International application No. PCT/EP2013/062602, 9 pages.

International Search Report and Written Opinion issued on Dec. 6, 2013 in International application No. PCT/EP2013/062608, 11 pages.

International Preliminary Report on Patentability issued on Dec. 22, 2015 in International application No. PCT/EP2013/062608, 8 pages.

* cited by examiner

Fig. 1

PRIOR ART

LEAKAGE CANCELLATION FOR A MULTIPLE-INPUT MULTIPLE-OUTPUT TRANSCEIVER

CROSS-REFERENCE TO RELATED APPLICATIONS

This application is a 35 U.S.C. §371 National Phase Entry Application from international patent application no. PCT/EP2013/068025, filed Aug. 30, 2013, and designating the United States, which claims priority to International applications Nos. PCT/EP2013/062602, filed Jun. 18, 2013 and PCT/EP2013/062608, filed Jun. 18, 2013. The contents of the aforementioned applications are incorporated by reference.

TECHNICAL FIELD

The present disclosure relates to a transceiver arrangement, a radio link, and a method for point-to-point radio communication.

BACKGROUND

Mobile communication systems are continuously growing denser in metropolitan areas. With an increasing number of subscribers requiring improved coverage and higher bandwidth, the area covered by a single base station shrinks from city districts to blocks and further down to streets and even parts of streets.

The backhaul networks used to aggregate and transport user traffic into the core network must evolve accordingly to match these new requirements. Denser and more highly occupied networks imply, among other things, that fixed point-to-point radio links, such as the widely deployed microwave radio links, must continue to grow more spectrum efficient and affordable in order to stay attractive for these backhaul applications.

Line-of-sight, LOS, multiple-input multiple-output, MIMO, is a technology which enables communication of several independent data streams over a single frequency band. Thus, the spectral efficiency of a point-to-point radio link using LOS-MIMO technology is potentially much higher than that of a conventional single-input single-output, SISO, system using the same frequency resources, which only communicates a single data stream.

LOS-MIMO communication systems exploit multiple antennas at both ends of a fixed point-to-point radio link in order to achieve said increase in spectral efficiency. However, a prerequisite for enabling this type of MIMO communication is that the antennas of the LOS-MIMO transceiver arrangements are carefully positioned relative to each other, based on the radio link distance and also based on the center frequency of communication. Consequently, LOS-MIMO installations are associated with constraints on relative antenna positions.

From a network operator point of view, it is important that backhaul deployment is straightforward and cost effective. Emphasis is therefore on low cost, few variants, low weight, small footprint, and simplified configuration.

A problem with the LOS-MIMO technique, then, is that the constraints on antenna positions can become prohibitive, and prevent a cost effective and straight forward deployment of the radio link. This issue especially concerns LOS-MIMO communication over large distances and/or at low carrier frequencies, because the necessary antenna spacing on transmit and receive sides of the radio link can become very large; For a 50 km long radio link hop at around 6 GHz center frequency, the ideal antenna spacing is on the order of 35 meters between antennas at both ends of the radio link.

SUMMARY

An object of the present disclosure is to provide a transceiver arrangement, a radio link, and a method for radio communication which seeks to mitigate, alleviate, or eliminate one or more of the above-identified deficiencies in the art and disadvantages singly or in any combination and to provide improved means of increasing the spectral efficiency in fixed point-to-point radio links.

This object is obtained by a transceiver arrangement for a fixed point-to-point radio link. The transceiver arrangement comprises a transceiver connected to a first antenna and to a second antenna. The transceiver is arranged to transmit a first transmit signal via the first antenna in a first frequency band. The transceiver is also arranged to receive a first receive signal via the first antenna in a second frequency band. The transceiver is further arranged to transmit a second transmit signal via the second antenna in the second frequency band. The transceiver is also arranged to receive a second receive signal via the second antenna in the first frequency band. The transceiver arrangement is further adapted to suppress signals received via the first antenna in the first frequency band and also to suppress signals received via the second antenna in the second frequency band, the first frequency band being separated in frequency from the second frequency band.

A number of key advantages are obtained by the disclosed transceiver arrangement when used in a fixed point-to-point radio link, for instance;

The transceiver arrangement enables simultaneous transmission and reception of several independent data streams, resulting in increased spectral efficiency, just like a LOS-MIMO transceiver used in a radio link application with the same frequency resources. However, the constraints on antenna geometry associated with the LOS-MIMO technology are no longer relevant. This is because the receive in-band interference of a LOS-MIMO receiver has been replaced by transmit in-band interference, which voids the need for antennas to be positioned in order to provide pre-determined relative phase shifts between transmit and receive antennas, as is the case with a LOS-MIMO system. This relaxation of antenna position constraints greatly simplifies deployment of a highly spectrally efficient point-to-point radio link, especially when communication is over large distances and/or at low carrier frequencies.

The relaxed requirements on antenna separation also makes it possible to mount the transceiver arrangement or parts of the transceiver arrangement in a shared mechanical housing, providing for a smaller foot-print and a more cost effective deployment of a radio link utilizing the disclosed transceiver arrangement.

Also, while a LOS-MIMO transceiver system must handle strong in-band interference originating from several inbound independent data streams in a single frequency band, the disclosed transceiver arrangement instead processes in-band interference which originates from the same transceiver arrangement. This in-band interference signal, originating from known transmit signals, is to a large extent also a known signal. This potentially simplifies receiver design, allowing for a more straight forward and cost effective design of interference cancellation schemes used in the transceiver arrangement.

Further, since the present transceiver arrangement transmits simultaneously in two different frequency bands, and also receives simultaneously in two different frequency bands, frequency diversity is obtained in both directions across a fixed point-to-point radio link. This frequency diversity is obtained at no extra cost, and can be expected to increase availability of a point-to-point radio link utilizing the transceiver arrangement disclosed herein.

According to an aspect, each of the first and the second antenna constitutes a directive antenna arranged to provide an increased antenna gain in a first direction, and a reduced antenna gain in a second direction, the first direction being the main transmit direction of the directive antenna, the second direction being the direction of the other of the first and the second antenna.

Consequently, the in-band interference affecting the present transceiver arrangement, generated from the transmit signals of said transceiver arrangement, is reduced by the use of directive antennas.

According to an aspect, at least one of the first and the second antenna constitutes an antenna array with steerable antenna transmission pattern, the antenna array being arranged to minimize antenna gain in the direction of the other of the first and the second antenna.

The use of an antenna array with steerable antenna transmission pattern reduces requirements on installation precision during deployment, since the steerable antenna array can be calibrated after deployment to provide a minimum of transmit signal in-band interference in receive signals, while still providing a large antenna gain in the main transmit direction of the transceiver arrangement.

According to an aspect, the transceiver further comprises a transmit interference cancellation device. The transmit interference cancellation device is arranged to suppress interference components comprised in the first and in the second receive signal originating from the second and from the first transmit signal, respectively. The transmit interference cancellation device is arranged to process the first and the second transmit signal to generate a first and a second cancellation signal, respectively. The transmit interference cancellation device is also arranged to combine the first cancellation signal with the second receive signal to generate an interference suppressed second receive signal, and to combine the second cancellation signal with the first receive signal to generate an interference suppressed first receive signal.

By the disclosed transmit interference cancellation device in-band interference is suppressed. This leads to an improved receive signal quality comprising less in-band interference and consequently also an improved receiver data detection performance.

According to an aspect, the transceiver arrangement is further arranged for dual polarization operation. The transceiver comprises a first and a second transceiver sub-unit, the first and the second transmit signal comprising first and second polarization components arranged to be generated by the first and by the second transceiver sub-unit, respectively. The first and the second receive signal comprising first and second polarization components arranged to be received by the first and by the second transceiver sub-unit, respectively.

By said dual polarization operation, the spectral efficiency of the disclosed system is improved by up to a factor of two.

According to an aspect, the transceiver arrangement further comprises a primary transceiver arrangement and a secondary transceiver arrangement, as well as a line-of-sight, LOS, multiple-input multiple-output, MIMO, receiver. The inter-antenna distances of the aggregate transceiver arrangement are constrained by a pre-determined function of a communication link distance and the center frequency of the first and of the second frequency band, said pre-determined function being specified to constrain allowable inter-antenna distances to distances which allow spatial multiplex by the LOS-MIMO receiver in the first and in the second frequency band.

Consequently, the present technique can be combined with traditional LOS-MIMO technique in order to achieve even higher spectral efficiency.

The object stated above of providing improved means of increasing the spectral efficiency in a fixed point-to-point radio link is also obtained by a radio link arranged for point-to-point radio communication over a distance D between a first and a second site. The radio link comprising a first transceiver arrangement disposed at the first site, and a second transceiver arrangement disposed at the second site. The first transceiver arrangement being arranged to communicate with the second transceiver arrangement by means of simultaneous transmission and reception in a first and in a second frequency band.

Said object of providing improved means of increasing the spectral efficiency in a fixed point-to-point radio link is further obtained by a method for transmitting and receiving radio signals by a transceiver arrangement. The method comprises the step of transmitting a first transmit signal via a first antenna in a first frequency band, and also the step of receiving a first receive signal via the first antenna in a second frequency band. The method also comprises the step of transmitting a second transmit signal via a second antenna in the second frequency band, as well as the step of receiving a second receive signal via the second antenna in the first frequency band. The method also comprises the step of suppressing signals received via the first antenna in the first frequency band and also suppressing signals received via the second antenna in the second frequency band. The first frequency band being separated in frequency from the second frequency band.

According to an aspect, the method further comprises the step of cancelling transmit interference signal components comprised in the first and in the second receive signal, which transmit interference signal components originate from the second and from the first transmit signal, respectively. The step of cancelling comprising processing and combining each transmit signal with the corresponding shared frequency receive signal into a first and a second interference-suppressed receive signal.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Aspects of the present disclosure will be described more fully hereinafter with reference to the accompanying drawings. The apparatus' and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

Figure 1:
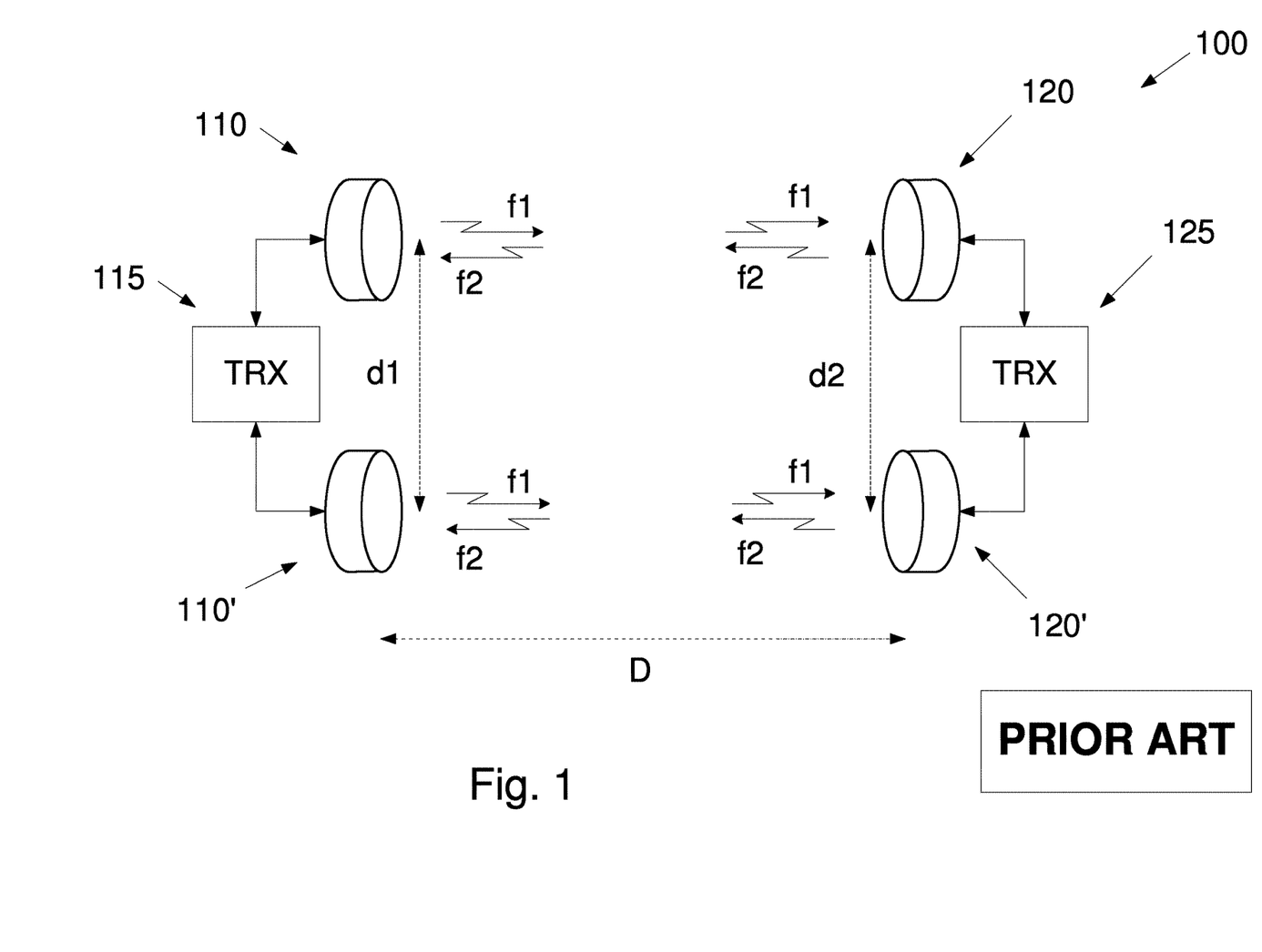
FIG. 1 shows a multi-antenna LOS-MIMO communication system according to prior art.

FIG. 1 shows a line-of-sight, LOS, multiple-input multiple-output, MIMO, fixed point-to-point radio link 100 according to prior art.

Herein, a fixed point-to-point radio link is a communication system adapted for communication between a first and a second site. The two sites are fixed, i.e., the transceivers in the communication system are immobile. An example of a fixed point-to-point radio link are the widely deployed microwave radio links used for instance in the cellular backhaul networks.

In FIG. 1, a first transceiver, TRX, 115 communicates with a second transceiver, TRX, 125 over a distance D meters.

Throughout this text, a transceiver is to be interpreted in a wide sense as a communications device adapted for transmission, reception, and detection of radio frequency signals carrying one or several data streams. The data stream carry information, i.e., as modulation symbols. Consequently, a transceiver may in different aspects described herein comprise radio frequency components such as radio frequency mixers, oscillators and channel filters, in order to generate a radio frequency transmit signal from a baseband signal and also to generate a baseband signal from a received radio frequency signal.

A transceiver may also, according to different aspects described herein, comprise modulators and demodulators supporting for example quadrature amplitude modulation, QAM, communication, and also include detection devices and channel coding devices, adapted to simultaneously handle a plurality of data streams.

The first transceiver 115 uses two antennas 110, 110' disposed d1 meters apart for transmission and reception of radio signals. The second transceiver 125 also uses two antennas 120, 120' disposed d2 meters apart for transmission and reception of radio signals. Transmission from the first transceiver 115 takes place in a frequency band f1 and reception is done in a frequency band f2, while the second transceiver 125 transmits in the frequency band f2 and receives in the frequency band f1. The frequency band f1 is separated from the frequency band f2, meaning that the two frequency bands do not share any frequencies.

It should be noted that one single frequency band is used in one direction across the radio hop and another frequency band is used in the reverse direction across the radio hop. Thus, no frequency diversity is obtained in FIG. 1.

In order for LOS-MIMO communication to be successful, it is known that antennas 110, 110', 120, 120' must be positioned in order to provide pre-determined relative phase shifts between transmit and receive antennas. This constrained placement of antennas is a fundamental concept underlying the LOS-MIMO technology. Without proper antenna placement, LOS-MIMO communication may not at all be possible, or the signal to noise ratio, SNR, of the communication system may become very low.

Suitable inter-antenna distances d1 and d2 for enabling successful LOS-MIMO communication are determined by a function of communication frequency, i.e., the frequencies in frequency bands f1 and f2, and the radio link distance D. Thus, LOS-MIMO communication systems are associated with geometry constraints which limit the possibilities of placing antennas.

A problem with the antenna geometry constraint discussed above, i.e., the constraints on antenna distances d1 and d2, is that for long hops at lower frequency bands, i.e., for large D and for low frequencies in frequency bands f1 and f2, the preferred antenna separation may become prohibitively large. E.g., for a 50 km hop at 6 GHz the optimal separation distance is around 35 meters at both ends of the radio hop. Also, at higher frequencies and for shorter hops a substantial antenna separation is required. E.g., 6 m at both ends for a 10 km hop at 38 GHz. This is a disadvantage of the LOS-MIMO technology in some cases, since it complicates deployment.

A challenge when implementing a LOS-MIMO receiver is that several unknown data streams are received in the same frequency band. Consequently, when detecting any one of these data streams; strong in-band interference from the other data streams must be handled. This strong in-band interference originates from at least partly unknown signals, which complicates receiver design.

Figure 2:
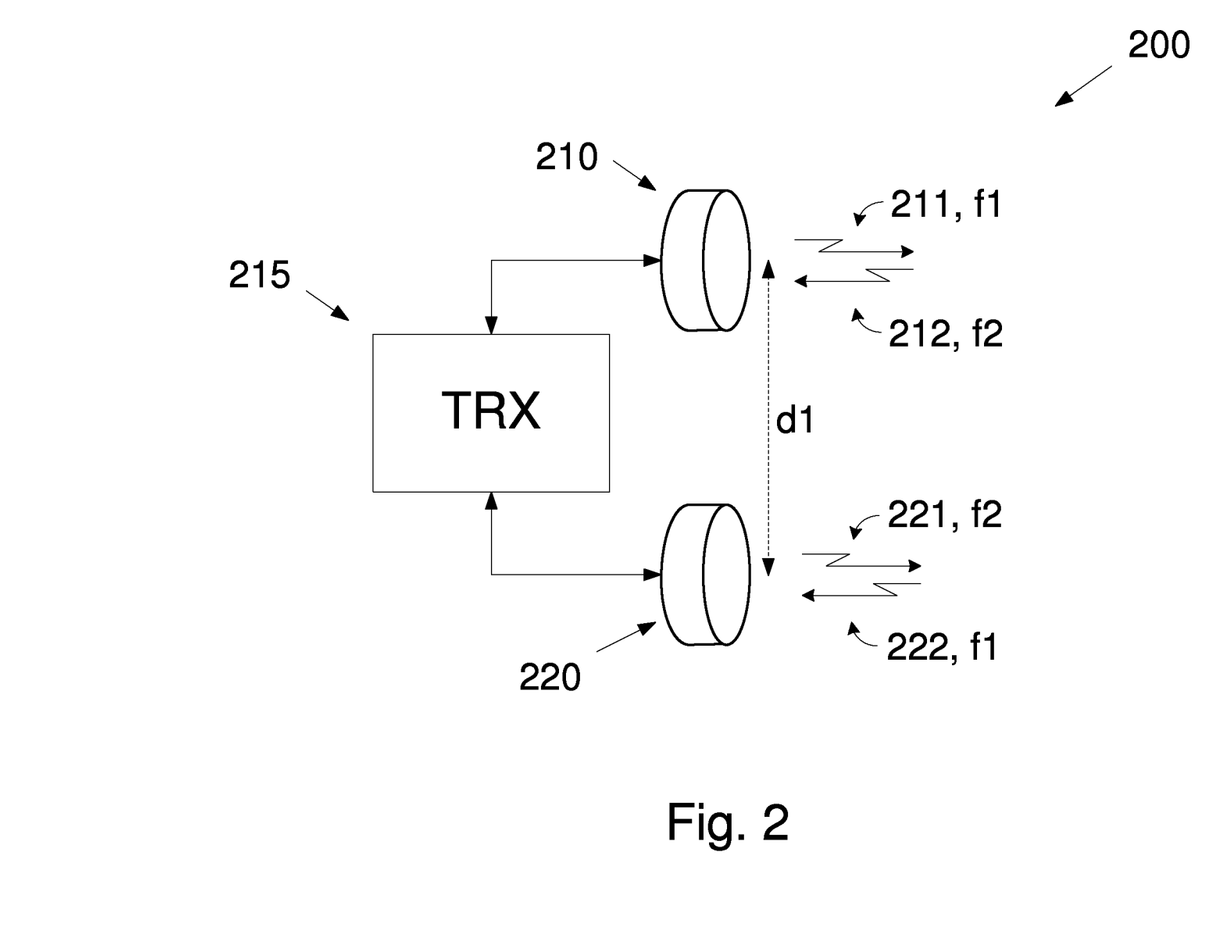
FIGS. 2-4 show embodiments of a transceiver arrangement.

FIG. 2 shows a transceiver arrangement 200 for a fixed point-to-point radio link. The transceiver arrangement 200 comprises a transceiver 215 connected to a first antenna 210 and to a second antenna 220. Thus, so far, the transceiver arrangement 200 shown in FIG. 2 resembles a LOS-MIMO transceiver arrangement such as those 115, 125 shown in FIG. 1. However, the transceiver 215 is in FIG. 2 arranged to transmit a first transmit signal 211 via the first antenna 210 in a first frequency band f1, and to receive a first receive signal 212 via the first antenna 210 in a second frequency band f2. The transceiver 215 is also arranged to transmit a second transmit signal 221 via the second antenna 220 in the second frequency band f2, and to receive a second receive signal 222 via the second antenna 220 in the first frequency band f1.

The first frequency band f1 is separated in frequency from the second frequency band f2. This means that no frequencies of the first frequency band f1 are present in the second frequency band f2, and vice versa. Consequently, either of the first or the second frequency band can be extracted or suppressed by means of passive filtering techniques at radio frequency, RF, at an intermediate frequency, IF, or at baseband.

The transceiver arrangement 200 is further adapted to suppress signals received via the first antenna 210 in the first frequency band f1 and also to suppress signals received via the second antenna 220 in the second frequency band f2. This suppression of received signals is, according to an aspect achieved by means of passive filtering, using passive filters implemented at radio frequency, RF, at an intermediate frequency, IF, and/or at baseband level.

Thus, when comparing the transceiver arrangement 200 in FIG. 1 to the arrangements in FIG. 2, it is noted that the transmit and receive frequency bands of one of the antennas have been switched. A number of advantages are obtained by this re-structuring of transmit and receive frequencies;

First, the transceiver arrangement 200, when used together with a similar transceiver arrangement 200 in a fixed point-to-point radio link application, enable communication of several independent data streams, leading to an increased spectral efficiency, just like the LOS-MIMO transceiver set-up shown in FIG. 1. However, the constraints on antenna geometry associated with LOS-MIMO are no longer present. This is because receive in-band interference has been replaced by transmit in-band interference, which voids the need for antennas to be positioned in order to provide pre-determined relative phase shifts between transmit and receive antennas, as was the case with the set up shown in FIG. 1.

Second, while the LOS-MIMO transceivers 115, 125 shown in FIG. 1 must handle interference from the several inbound data stream on a single frequency band, the transceiver 215 shown in FIG. 2 must instead handle interference which originates from its own transmitted signals 211, 221. These signals are to a large extent known, which simplifies receiver design, i.e., allows for a more straight forward design of the interference cancellation scheme used by the transceiver 215.

Third, since the transceiver 215 now transmits in two different frequency bands, and also receives in two different frequency bands, frequency diversity is obtained. This frequency diversity can be expected to increase availability of a fixed point-to-point radio link using the present technique.

According to an aspect, the transceiver 215 is not comprised in a single housing, but instead constitutes a collection of separate units interfacing each other using, e.g., cables, for the exchange of signals. Such a collection of separate units will be further discussed in connection to FIG. 8 below.

According to an aspect, each of the first 210 and the second 220 antenna constitutes a directive antenna arranged to provide an increased antenna gain in a first direction, and a reduced antenna gain in a second direction. The first direction is preferably the main transmit direction of the directive antenna, i.e., the direction of the other site of the point-to-point radio link. The second direction is preferably the direction of the other of the first 210 and the second 220 antenna.

Thus, by using a directive antenna which provides a reduced antenna gain in the second direction, interference from the transmit signals of the transceiver arrangement 200 is reduced.

According to an aspect, at least one of the first 210 and the second 220 antenna constitutes an antenna array with steerable antenna transmission pattern. The antenna array is then arranged to minimize antenna gain in the direction of the other of the first 210 and the second 220 antenna.

The use of a steerable antenna array provides a degree of adaptation which a regular directive antenna cannot provide. Thus, a further degree of transmit interference suppression may be obtained by the use of said steerable antenna array.

Several methods are available for the minimization of antenna gain of a steerable antenna array in a given direction, i.e., the direction of the other of the first 210 and the second 220 antenna, while maintaining a high gain in another direction. One such example is the transmission of a calibration signal from the steerable antenna array, followed by manual or automated calibration of the antenna transmission pattern of the steerable antenna array such as to provide a high gain in the direction of the other site of the point-to-point radio link, and a low antenna gain in the direction of the other of the first 210 and the second 220 antenna, based on said transmitted calibration signal which is received by the other of the first 210 and the second 220 antenna, and also at the other end of a radio link utilizing said steerable antenna array.

Figure 3A:
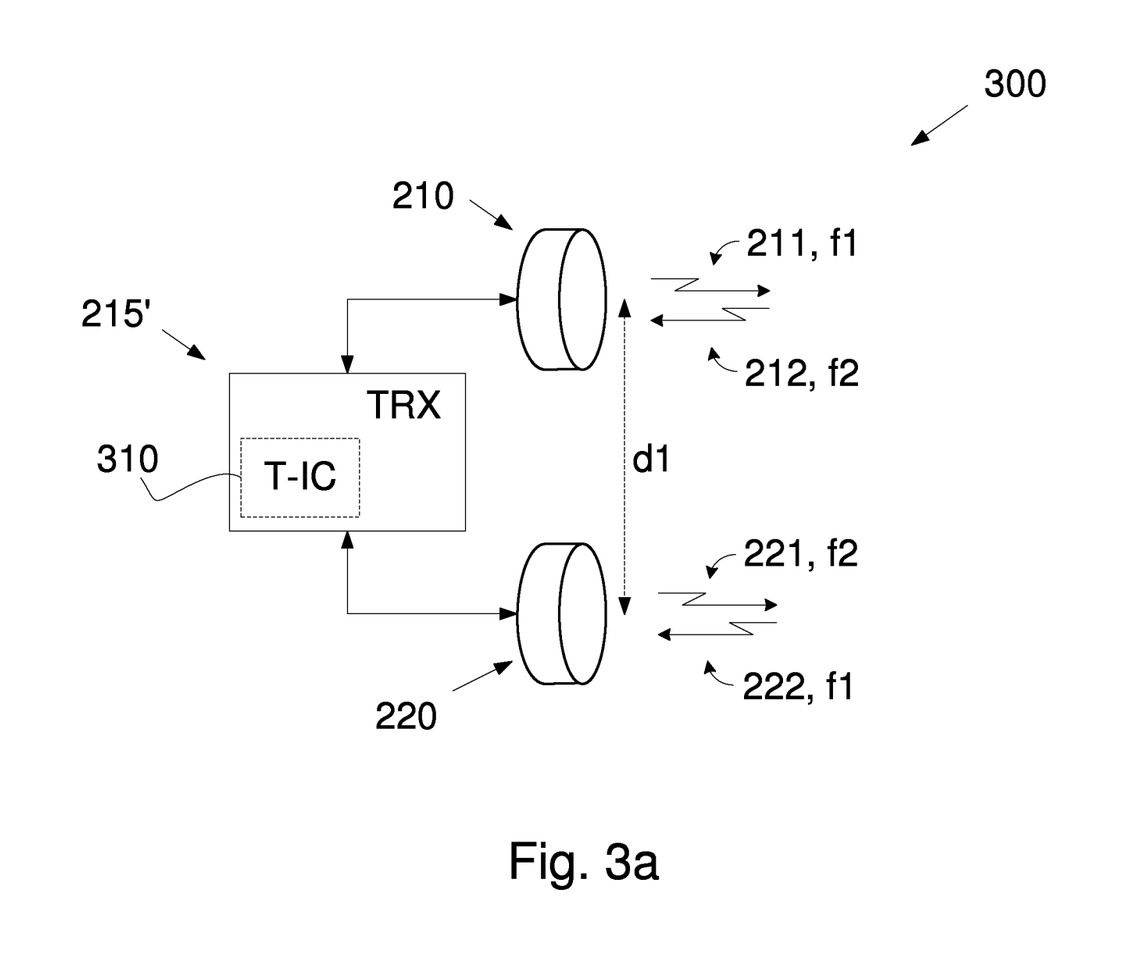

FIG. 3a shows a transceiver arrangement 300 wherein the transceiver 215' further comprises a transmit interference cancellation device, T-IC, 310. The transmit interference cancellation device 310 is arranged to suppress interference components comprised in the first 212 and in the second 222 receive signal, which interference components originate from the second 211 and from the first 221 transmit signal, respectively.

It is noted that said transmit interference cancellation device 310 can be implemented in the radio frequency, RF, domain, in an intermediate frequency, IF, domain, or at baseband level, or a combination of RF, IF, and baseband.

The transmit interference cancellation device 310 is arranged to process the first 211 and the second 221 transmit signal to generate a first and a second cancellation signal, respectively. According to an aspect, said processing of transmit signals comprises filtering by adaptive filters, which adaptive filters are arranged to be updated by a least-mean-squares, LMS, algorithm.

The transmit interference cancellation device 310 is arranged to combine the first cancellation signal with the second receive signal 222 to generate an interference suppressed second receive signal, and to combine the second cancellation signal with the first receive signal 212 to generate an interference suppressed first receive signal.

An LMS algorithm requires an input signal for adaptation. According to an aspect, the input signal used to drive each of the LMS algorithms is the respective interference suppressed receive signal. Consequently, any components of the receive signal which are correlated with components in the transmit signal are suppressed in the respective interference suppressed receive signal.

Using the interference suppressed receive signal to drive the LMS algorithm also brings the additional advantage of not having to do any detection of modulation symbols comprised in the received signals. Consequently, the transmit interference cancellation device 310 is according to an aspect implemented as a blind signal processing device, i.e., not aware of the actual information transmitted across the radio link.

Figure 3B:
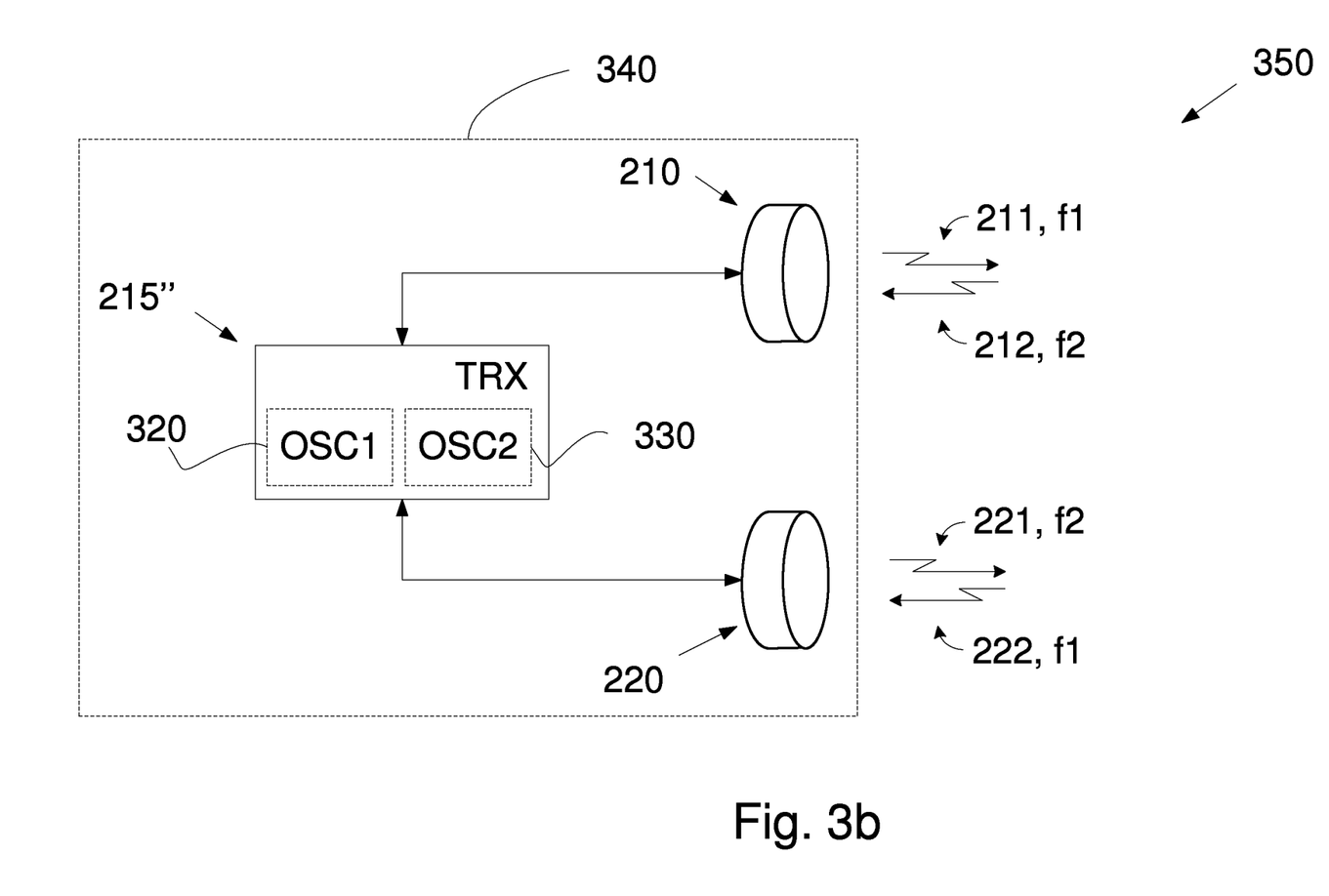

FIG. 3b shows a transceiver arrangement 350 wherein the first 210 and the second 220 antenna are co-located and are enclosed by a common antenna housing 340.

According to an aspect, the common antenna housing 340 further encloses the transceiver 215", in addition to the first 210 and the second 220 antenna.

According to a further aspect, the antenna housing 340 in addition to antennas 210, 220 encompasses specific parts of the transceiver 215", specifically the radio frequency, RF, parts of the transceiver 215".

According to an aspect, a first common local oscillator 320 is used for parts of the transceiver arrangement 350 operating in the first frequency band f1, and a second common local oscillator 330, or a second common local oscillator signal derived from the first common local oscillator 320, is used for parts of the transceiver arrangement 350 operating in the second frequency band f2.

Herein, a common oscillator means that devices using a given sinusoidal input signal, i.e., a frequency up-converter or a frequency down-converter, also known as a modulator and a de-modulator, uses the same source of the sinusoidal input signal. This further means that the two sinusoidal input signals are phase synchronous, or near phase synchronous, having been generated by the same physical oscillator device.

A benefit of using common local oscillators such as the common local oscillators 320, 330 shown in FIG. 3b is an increased resilience to phase noise generated by imperfections in oscillators. Since there is only a single oscillator per frequency band, the phase of a signal after up-conversion to a given radio frequency, and the phase after down-conversion of said signal from the same radio frequency will not change fast in relation to each other.

Thus, uncertainty regarding phase differences within one site in a point-to-point radio link is reduced, leaving only uncertainty regarding phase differences between sites of a point-to-point radio link.

This also means that the phase of a reference transmit signal of the transceiver 215" and the corresponding interference component in a received signal will not change fast in relation to each other. Consequently, the design and implementation of the transceiver 215" is simplified.

In particular, the above mentioned generation of a precise first and second cancellation signal is simplified since no fast changes in relative phase difference between interference components comprised in the received signals originating from the transmit signal, and the transmit signal itself, can be expected, since both have been generated, i.e., down-converted and up-converted, respectively, by said common local oscillator.

Figure 4:
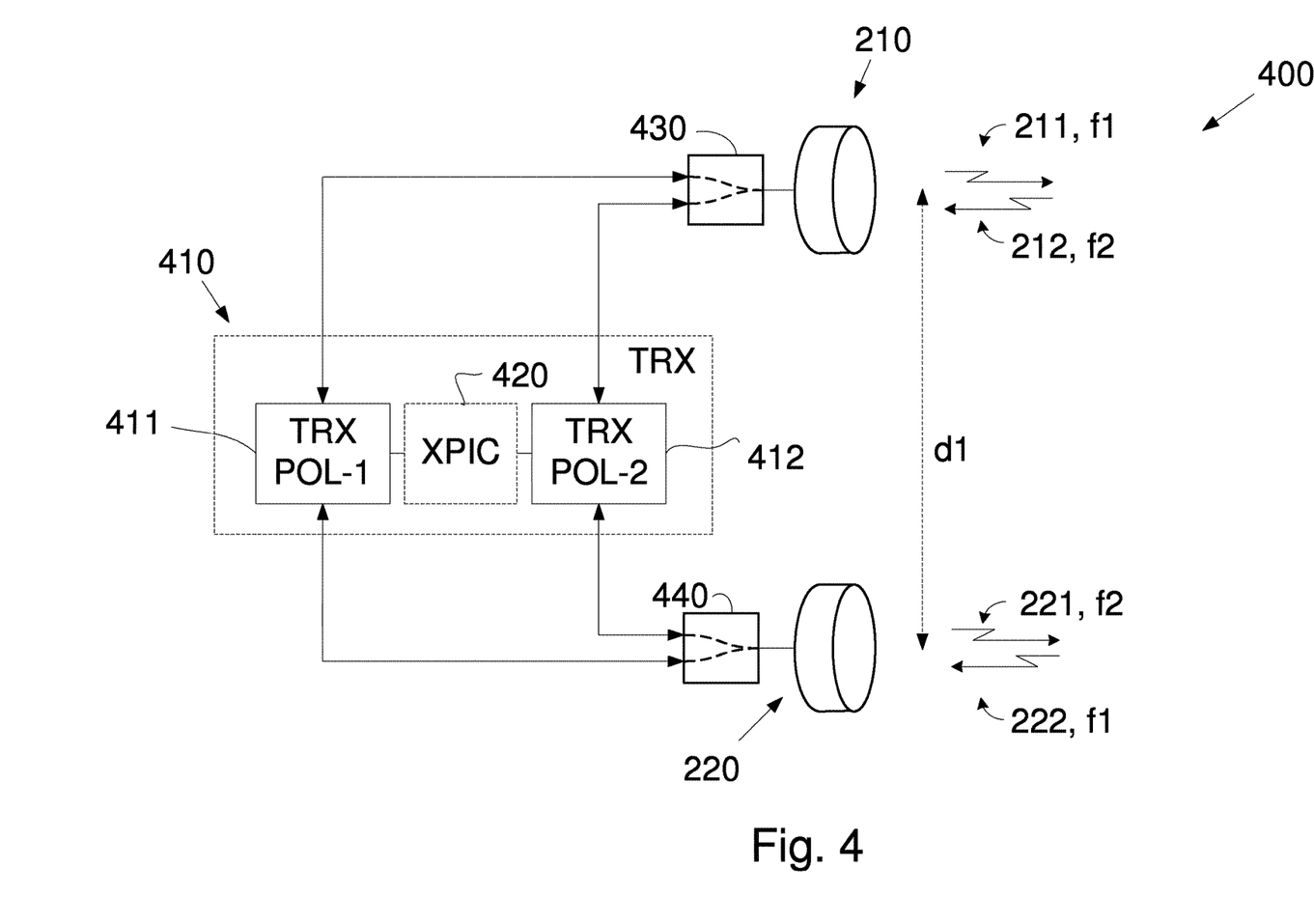

FIG. 4 shows a transceiver arrangement 400 further arranged for dual polarization operation, i.e., adapted for transmission and reception of dual polarized signals. The transceiver 410 here comprises a first 411 and a second 412 transceiver sub-unit, where each sub-unit is adapted to process one polarization component.

The first 211 and the second 221 transmit signal here comprises first and second polarization components arranged to be generated by the first 411 and by the second 412 transceiver sub-unit, respectively. The first 212 and the second 222 receive signal also comprises first and second polarization components arranged to be received by the first 411 and by the second 412 transceiver sub-unit, respectively.

By the feature of dual polarization operation, the spectral efficiency of the transceiver arrangement 400 is potentially doubled compared to a single polarization system. The transceiver arrangement 400 shown in FIG. 4 is capable of simultaneously receiving at least four data streams: one in each of the two polarization components in each of the first 212 and of the second 222 receive signal.

The transceiver arrangement 400 shown in FIG. 4 is also capable of simultaneously transmitting four independent data streams: one in each of the two polarization components in each of the first 211 and of the second 221 transmit signal.

According to an aspect, the transceiver 410 further comprises a cross-polar interference cancellation device, XPIC, 420. The cross-polar interference cancellation device 420 is arranged to suppress cross-polar interference between first and second polarization components of the first 212 and the second 222 receive signal.

The cross-polar interference cancellation device 420 is arranged to process the first polarization components of the first 212 and of the second 222 receive signal to generate first cancellation signals, and also to process second polarization components of the first 212 and of the second 222 receive signal to generate second cancellation signals.

The cross-polar interference cancellation device 420 is further arranged to combine the first cancellation signals with the second polarization components of the first 212 and of the second 222 receive signal to generate interference suppressed second polarization components of the first 212 and of the second 222 receive signal, and also to combine the second cancellation signals with the first polarization components of the first 212 and of the second 222 receive signal to generate interference suppressed first polarization components of the first 212 and of the second 222 receive signal.

Thus, by the feature of the cross-polar interference cancellation device 420, cross-polar interference which hampers spectral efficiency and availability of communication is suppressed.

According to an aspect, the processing arranged to be carried out by the cross-polar interference cancellation device 420 comprises filtering by adaptive filters arranged to be updated by LMS algorithms. Said LMS algorithms being driven by error signals received from a detection unit of the transceiver 415. The detection unit being adapted to detect modulated data signals comprised in the received first and second polarization components of the first 212 and the second 222 receive signal, i.e., a total of four independent data streams.

According to an aspect, the modulated data signals comprise quadrature amplitude modulation, QAM, data symbols.

According to an aspect, the transceiver arrangement 400 further comprises a first 430 and a second 440 antenna interface unit connected between the first antenna 210 and the transceiver 410, and between the second antenna 220 and the transceiver 410, respectively.

Each of the antenna interface units 430, 440 is arranged to receive transmit signals from the first 411 and from the second 412 transceiver sub-units, and to generate a dual polarized transmit signal comprising the first and the second polarization component, and to transmit the dual polarized transmit signal via the connected antenna.

Each of the antenna interface units 430, 440 is also arranged to receive a dual polarized receive signal comprising a first and a second polarization component from the connected antenna and to separate the dual polarized receive signal into the first and the second polarization component, as well as to output the first and the second polarization component of the dual polarized receive signal to the corresponding transceiver sub-unit.

Figure 5:
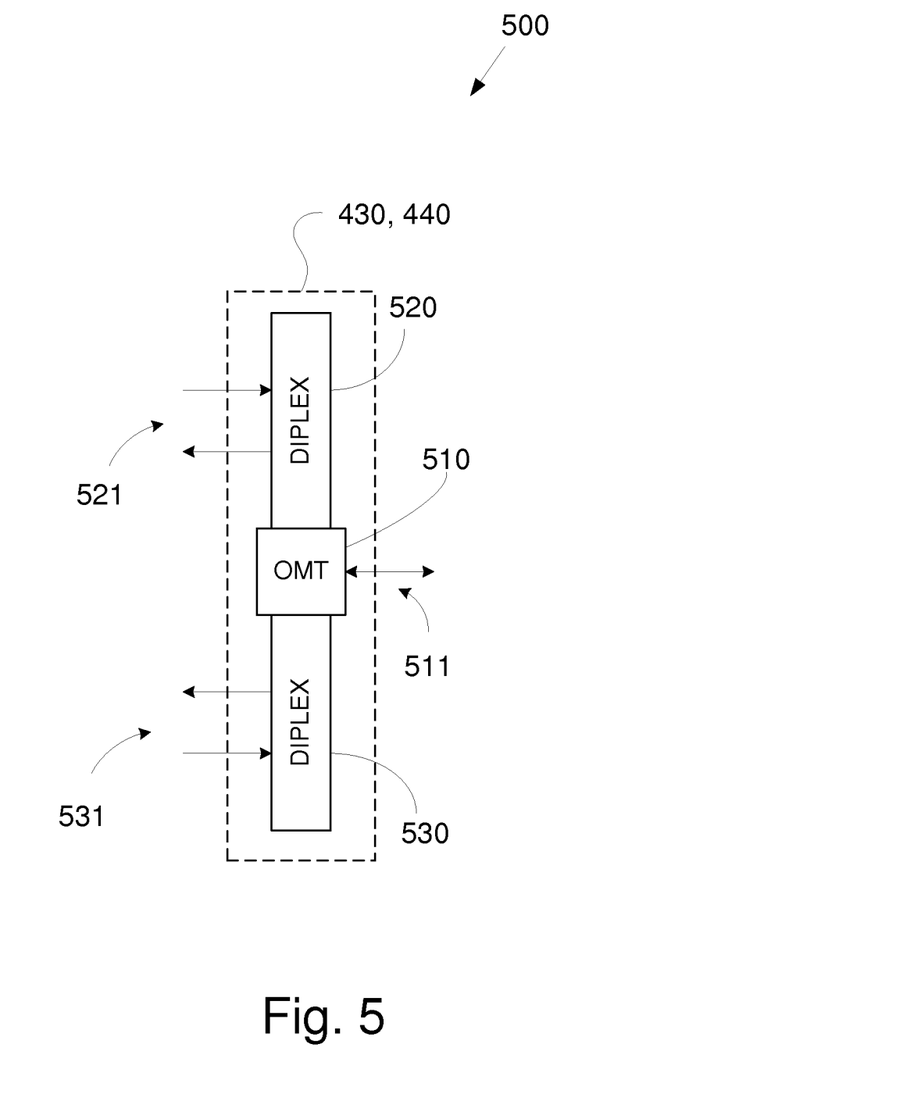
FIG. 5 shows an antenna interface unit.

According to an aspect, shown in FIG. 5, at least one antenna interface unit 500 comprises an orthomode transducer 510, OMT, connected to a first 520 and to a second 530 diplexer unit. The OMT 510 is arranged to be connected to an antenna unit via an antenna port 511 of the antenna interface unit. The first 520 and the second 530 diplexer unit is arranged to be connected to a transceiver via a first 521 and a second 531 bi-directional transceiver port, respectively.

Figure 6:
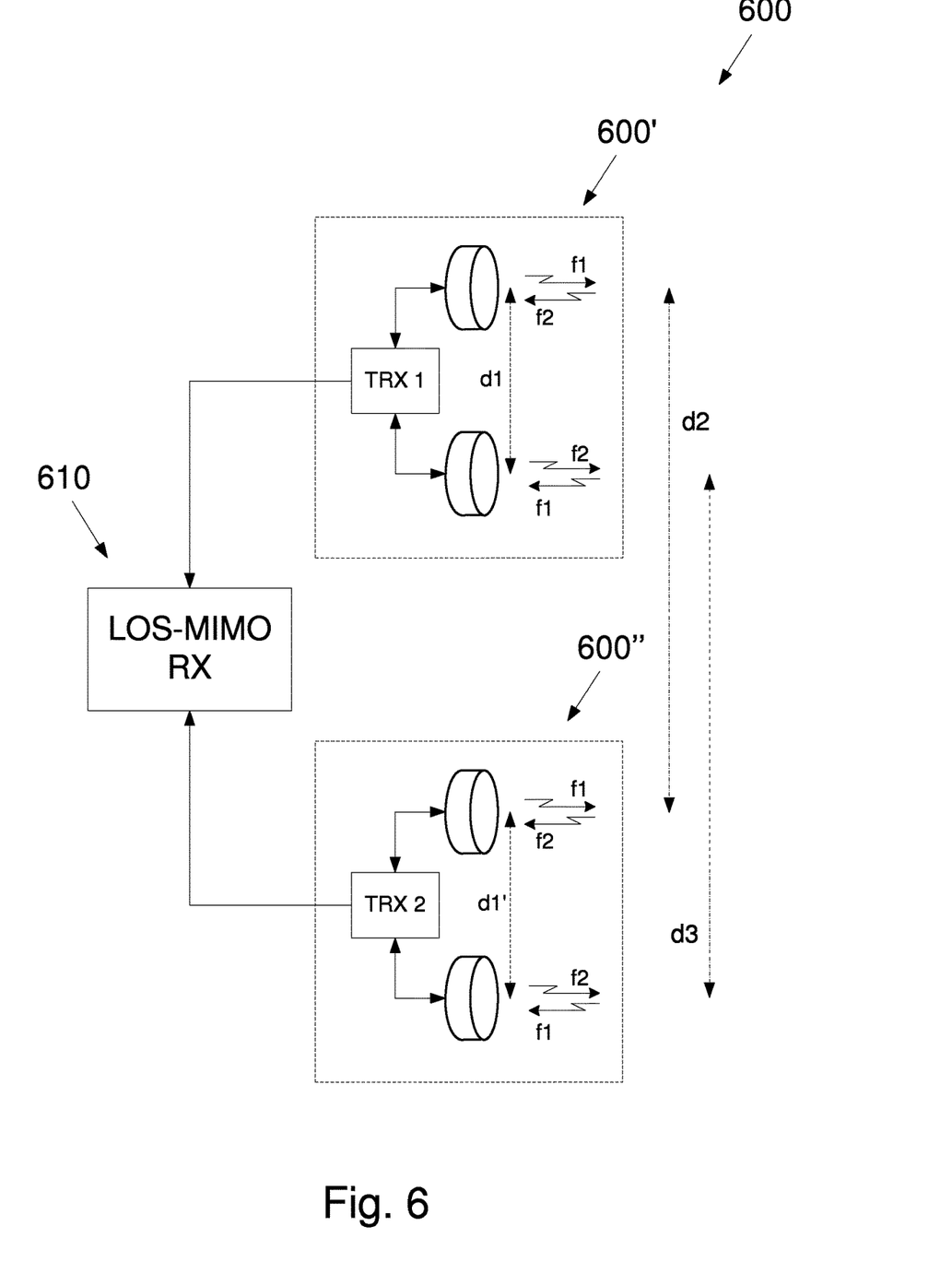
FIG. 6 shows an additional embodiment of a transceiver arrangement, and FIG. 7 schematically shows a radio link.

FIG. 6 shows a transceiver arrangement 600 further comprising a primary transceiver arrangement 600' according to any of the above transceiver arrangements 200, 300, 350, 400 described in connection to FIGS. 2-5 and also a secondary transceiver arrangement 600" according to any of the above transceiver arrangements 200, 300, 350, 400 described in connection to FIGS. 2-5.

The transceiver arrangement 600 shown in FIG. 6 further comprises a line-of-sight, LOS, multiple-input multiple-output, MIMO, receiver 610. The inter-antenna distances d1,d2,d3,d4 of the transceiver arrangement 600 are constrained by the above-mentioned function of communication link distance and center frequency of the first f1 and of the second f2 frequency band. This function is, as mentioned above, specified to constrain allowable inter-antenna distances d1,d2,d3,d4 to distances which allow spatial multiplex by the LOS-MIMO receiver 610 in the first f1 and in the second f2 frequency band. This means that inter antenna distances are set such as to provide relative phase shifts between transmit and receive antennas to enable LOS-MIMO communication.

Thus, the LOS-MIMO technology described above in connection to FIG. 1 is according to aspects combined with the technique of the present disclosure. Such a combination as the arrangement 600 schematically shown in FIG. 6 can potentially transmit up to eight independent data streams in case dual polarization is employed, and also receive and detect eight independent data streams. Consequently, the spectral efficiency of the transceiver arrangement 600 shown in FIG. 6 is improved up to a factor of eight compared to a classical single-input single-output, SISO, system.

According to an aspect, the LOS-MIMO receiver 610 is further arranged to suppress transmit signal interference in the received signals, the transmit signal interference originating from transmit signals of the aggregate transceiver arrangement 600', 600".

According to an aspect, said suppression of transmit signal interference is facilitated by means of a transmit interference cancellation device, T-IC, 310 which is comprised in the transceiver arrangement 600 and which has been described in connection to FIG. 3a.

Figure 7:
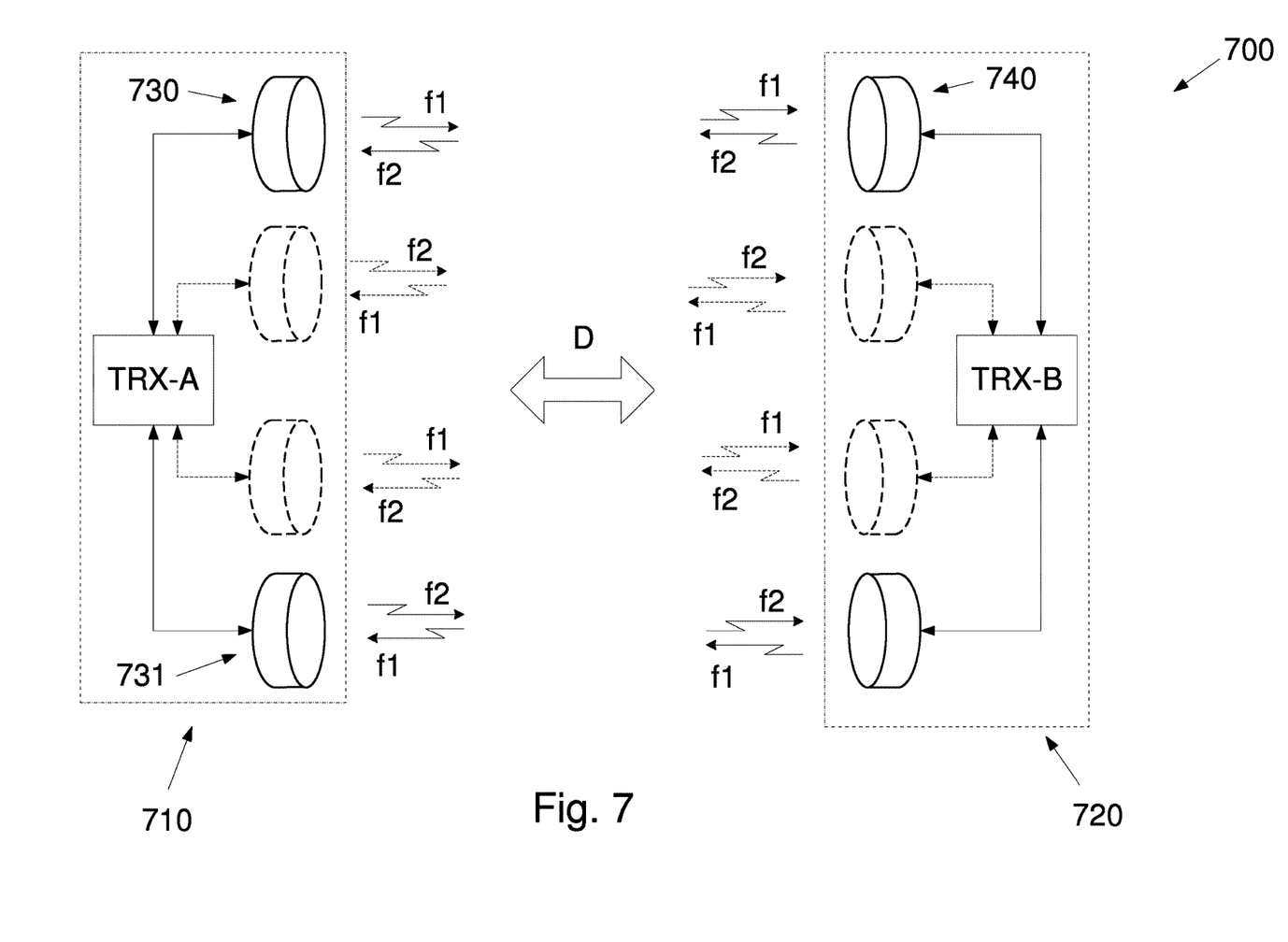

FIG. 7 shows a radio link 700 arranged for point-to-point radio communication over a distance D between a first and a second site. The radio link 700 comprises a first transceiver arrangement 710 disposed at the first site, and a second transceiver arrangement 720 disposed at the second site. The first transceiver arrangement 710 is arranged to communicate with the second transceiver arrangement 710 by means of simultaneous transmission and reception in a first f1 and in a second f2 frequency band.

Note in FIG. 7 that the same frequency resources are used as in the LOS-MIMO radio link 100 shown in FIG. 1, i.e., the first frequency band f1 and the second frequency band f2. Thus, no extra frequency resources are consumed by the present technique, compared to a classic radio link deployment using a first frequency band in one direction, i.e., from the first site to the second site, and a second frequency band in the other direction, i.e., from the second site to the first site.

The interference situation of the transceiver arrangements 710, 720 can be understood from looking at FIG. 7. Consider the top-most antenna 730 of the left-most transceiver arrangement 710, and assume that dashed line antennas are not active. Said top-most antenna is arranged to transmit in the first frequency band f1 and receive in the second frequency band f2. The transceiver arrangement 710 is further adapted to suppress any signals received via said top-most antenna 730 in the first frequency band f1. Consequently, any transmissions in the first frequency band f1 are not contributing significantly to the interference of the receive signal of said top-most antenna 730. The main interference signals originate from transmissions in the second frequency band f2, other than the data stream of interest. The only such transmission is from the bottom-most antenna 731 of the left-most transceiver arrangement 710. The power of this interference signal is, according to aspects, significantly attenuated due to the use of directive antennas, or steerable antenna arrays.

Figure 8:
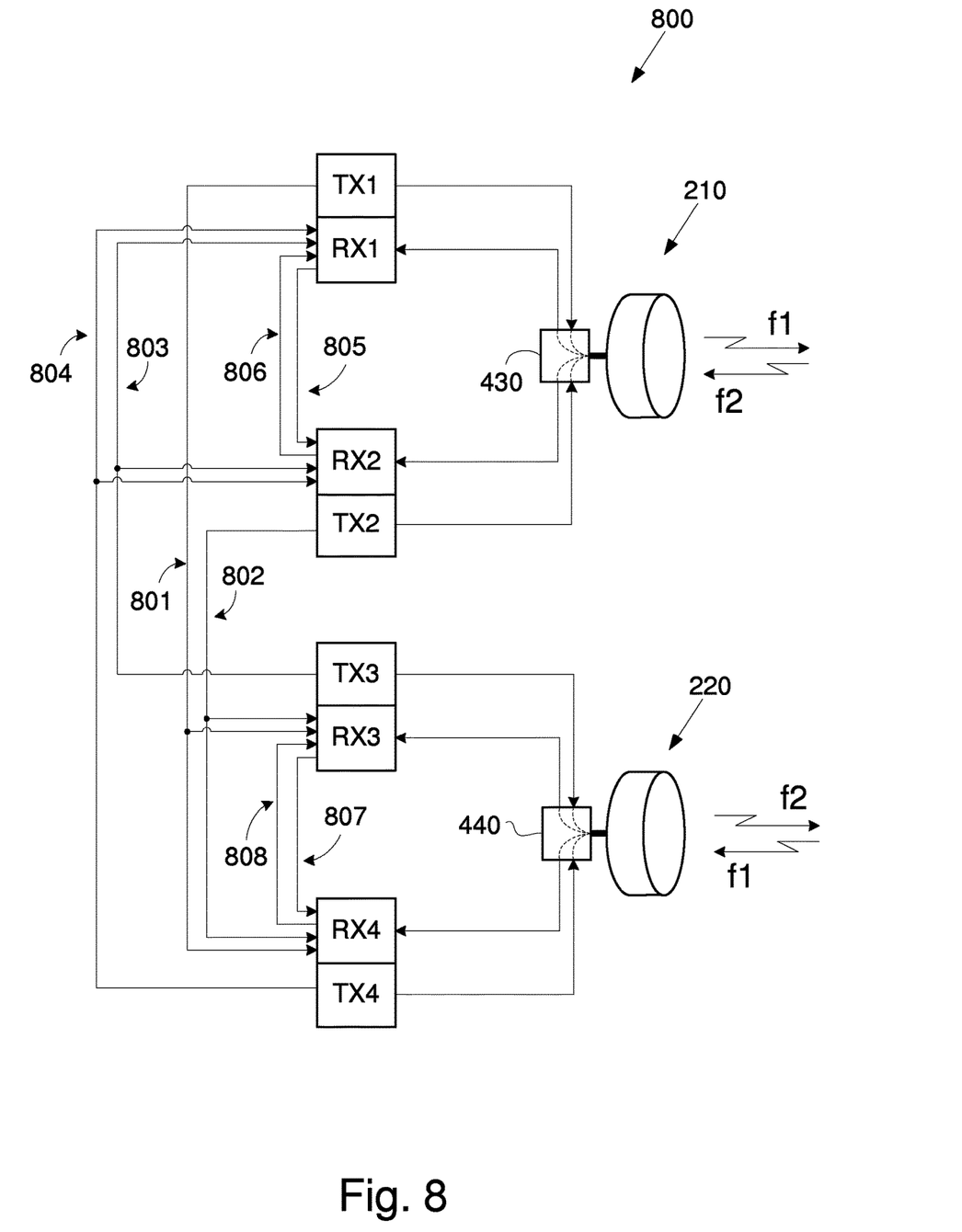
FIG. 8 shows a further embodiment of a transceiver arrangement.

FIG. 8 shows a dual polarization transceiver arrangement 800 where preferred interference cancellation functions are shown. Here, in FIG. 8, an arrow drawn between a transmitter, TX1-TX4, and a receiver, RX1-RX4, or between two receivers RX1-RX4, indicate that the two units exchange signals for interference cancellation purposes and thus suppress transmit interference or cross-polar interference.

Consequently, it is seen that receivers RX1 and RX2 are adapted to exchange receive signals 805, 806 in order to facilitate cross-polar interference cancellation. The same is true for receivers RX3 and RX4 which exchange receive signals 807, 808, also for cross-polar interference cancellation purposes.

It can also be seen in FIG. 8 that transmit interference cancellation is facilitated by signals exchange between transmitters and receivers. Receivers RX1 and RX2 which receive the different polarization components of signals in the second frequency band f2 is interfered by transmitters TX3 and TX4 which transmit the different polarization components in the second frequency band f2. Consequently receivers RX1 and RX2 receive the transmit signals 803, 804 from transmitters TX3 and TX4 in order to perform transmit interference cancellation. Also, receivers RX3 and RX4 which receive the different polarization components of signals in the first frequency band f1 is interfered by transmitters TX1 and TX2 which transmit the different polarization components in the first frequency band f1. Consequently receivers RX3 and RX4 receive the transmit signals 801, 802 from transmitters TX1 and TX2 in order to perform transmit interference cancellation.

It is also seen in FIG. 8 that the transceiver arrangement 800 comprises separate units for transmission, TX1-TX4, and for reception RX1-RX4.

Figure 9:
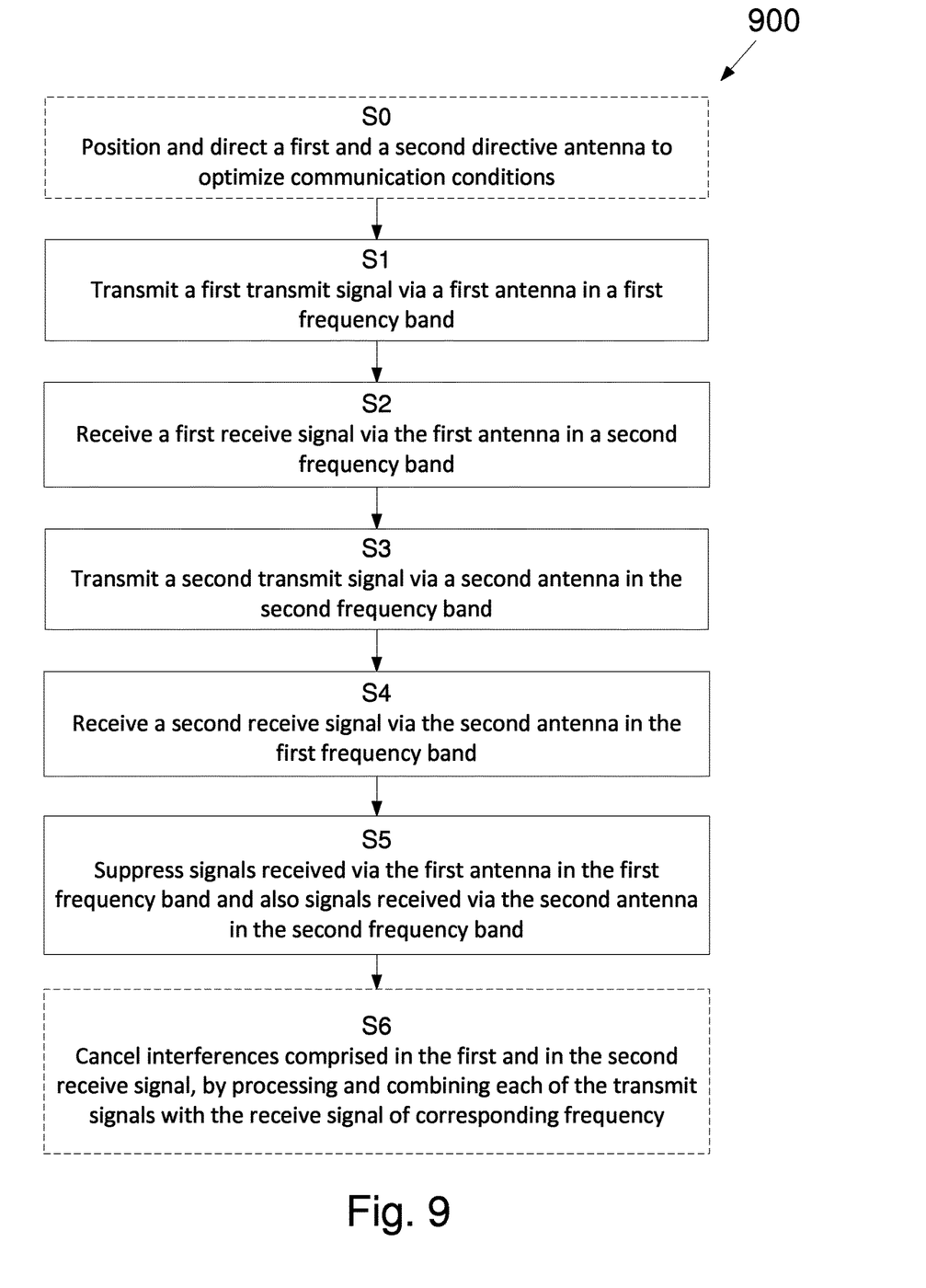
FIG. 9 shows a flowchart of a method of the disclosure.

FIG. 9 shows a flowchart of a method 900 for transmitting and receiving radio signals by a transceiver arrangement 200, 300, 350, 400, 800. The method 900 comprises the step of transmitting S1 a first transmit signal 211 via a first antenna 210 in a first frequency band f1, and also the step of receiving S2 a first receive signal 212 via the first antenna 210 in a second frequency band f2. The method 900 also comprises the step of transmitting S3 a second transmit signal 221 via a second antenna 220 in the second frequency band f2, as well as the step of receiving a second receive signal 222 via the second antenna 220 in the first frequency band f1.

The method 900 further comprises the step S5 of suppressing signals received via the first antenna 210 in the first frequency band f1 and also suppressing signals received via the second antenna 220 in the second frequency band f2, wherein the first frequency band 11 is separated in frequency from the second frequency band f2.

According to an aspect, each of the first 210 and the second 220 antenna constitutes a directive antenna arranged to provide an increased antenna gain in a first direction, and a reduced antenna gain in a second direction.

According to an aspect, the method 900 further comprises the introductory step of positioning and directing S0 the first 210 and the second 220 antenna to determine first and second directions of each of the first 210 and the second 220 antenna to optimize communication conditions.

According to an aspect, the method 900 further comprises the step of cancelling S6 transmit interference signal components comprised in the first 212 and in the second 222 receive signal, which transmit interference signal components originate from the second 221 and from the first 211 transmit signal, respectively. The step of cancelling S6 comprises processing and combining each transmit signal with the corresponding shared frequency receive signal into a first and a second interference-suppressed receive signal.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A transceiver apparatus for a fixed point-to-point radio link, the transceiver apparatus comprising:
    a first antenna; and
    a second antenna;
    wherein
    the transceiver apparatus is arranged to:
    transmit a first transmit signal via the first antenna in a first frequency band,
    receive a first receive signal via the first antenna in a second frequency band,
    transmit a second transmit signal via the second antenna in the second frequency band,
    receive a second receive signal via the second antenna in the first frequency band,
    the transceiver apparatus is adapted to suppress signals received via the first antenna in the first frequency band and suppress signals received via the second antenna in the second frequency band, and
    the first frequency band is separated in frequency from the second frequency band.

2. The transceiver apparatus of claim 1, wherein each of the first and the second antenna comprises a directive antenna arranged to provide an increased antenna gain in a first direction, and a reduced antenna gain in a second direction, the first direction being the main transmit direction of the directive antenna, the second direction being the direction of the other of the first and the second antenna.

3. The transceiver apparatus of claim 1, wherein at least one of the first and the second antenna comprises an antenna array with steerable antenna transmission pattern, the antenna array being arranged to minimize antenna gain in the direction of the other of the first and the second antenna.

4. The transceiver apparatus of claim 1, further comprising a transmit interference cancellation device, the transmit interference cancellation device being arranged to suppress interference components comprised in the first and in the second receive signal originating from the second and from the first transmit signal, respectively, the transmit interference cancellation device being arranged to process the first and the second transmit signal to generate a first and a second cancellation signal, respectively, the transmit interference cancellation device further being arranged to combine the first cancellation signal with the second receive signal to generate an interference suppressed second receive signal, and to combine the second cancellation signal with the first receive signal to generate an interference suppressed first receive signal.

5. The transceiver apparatus of claim 1, wherein the first and the second antenna are co-located and are enclosed by a common antenna housing.

6. The transceiver apparatus of claim 1, wherein a first common local oscillator is used for parts of the transceiver apparatus operating in the first frequency band, and a second common local oscillator, or a second common local oscillator signal derived from the first common local oscillator, is used for parts of the transceiver apparatus operating in the second frequency band.

7. The transceiver apparatus of claim 1, further arranged for dual polarization operation, the transceiver apparatus further comprising a first and a second transceiver sub-unit, the first and the second transmit signal comprising first and second polarization components arranged to be generated by the first and by the second transceiver sub-unit, respectively, the first and the second receive signal comprising first and second polarization components arranged to be received by the first and by the second transceiver sub-unit, respectively.

8. The transceiver apparatus of claim 7, further comprising a cross-polar interference cancellation device, XPIC, the cross-polar interference cancellation device being arranged to suppress interference between first and second polarization components of the first and the second receive signal, the cross-polar interference cancellation device being arranged to process first polarization components of the first and of the second receive signal to generate first cancellation signals, and also to process second polarization components of the first and of the second receive signal to generate second cancellation signals, the cross-polar interference cancellation device further being arranged to combine the first cancellation signals with the second polarization components of the first and of the second receive signal to generate interference suppressed second polarization components of the first and of the second receive signal, and also to combine the second cancellation signals with the first polarization components of the first and of the second receive signal to generate interference suppressed first polarization components of the first and of the second receive signal.

9. The transceiver apparatus of claim 7, further comprising a first and a second antenna interface unit, each of the antenna interface units being arranged to receive transmit signals from the first and from the second transceiver sub-units, and to generate a dual polarized transmit signal comprising the first and the second polarization component, and to transmit the dual polarized transmit signal via the connected antenna, each of the antenna interface units further being arranged to receive a dual polarized receive signal comprising a first and a second polarization component from the connected antenna and to separate the dual polarized receive signal into the first and the second polarization component, as well as to output the first and the second polarization component of the dual polarized receive signal to the corresponding transceiver sub-unit.

10. The transceiver apparatus of claim 9, wherein at least one antenna interface unit comprises an orthomode transducer, OMT, connected to a first and to a second diplexer unit, the OMT being arranged to be connected to an antenna unit via an antenna port of the antenna interface unit, the first and the second diplexer unit being arranged to be connected to a transceiver via a first and a second bi-directional transceiver port, respectively.

11. The transceiver apparatus of claim 1, further comprising a primary transceiver apparatus and a secondary transceiver apparatus, and a line-of-sight (LOS) multiple-input multiple-output (MIMO) receiver, the inter-antenna distances of the aggregate transceiver apparatus being constrained by a pre-determined function of a communication link distance and the center frequency of the first and of the second frequency band, said pre-determined function being specified to constrain allowable inter-antenna distances to distances which allow spatial multiplex by the LOS-MIMO receiver in the first and in the second frequency band.

12. The transceiver apparatus of claim 11, wherein the LOS-MIMO receiver is further arranged to suppress transmit signal interference in the received signals, the transmit signal interference originating from transmit signals of the aggregate transceiver apparatus.

13. A radio link arranged for point-to-point radio communication over a distance (D) between a first and a second site, the radio link comprising a first transceiver apparatus according to claim 1 disposed at the first site, and a second transceiver apparatus disposed at the second site, the first transceiver apparatus being arranged to communicate with the second transceiver apparatus by means of simultaneous transmission and reception in a first and in a second frequency band.

14. A method for transmitting and receiving radio signals by a transceiver apparatus, the method comprising:
 transmitting a first transmit signal via a first antenna in a first frequency band;
 receiving a first receive signal via the first antenna in a second frequency band;
 transmitting a second transmit signal via a second antenna in the second frequency band;
 receiving a second receive signal via the second antenna in the first frequency band; and
 suppressing signals received via the first antenna in the first frequency band and also signals received via the second antenna in the second frequency band, wherein the first frequency band is separated in frequency from the second frequency band.

15. The method of claim 14, wherein each of the first and the second antenna constitutes a directive antenna arranged to provide an increased antenna gain in a first direction, and a reduced antenna gain in a second direction, the method further comprising the introductory step of positioning and directing the first and the second antenna to determine first and second directions of each of the first and the second antenna to optimize communication conditions.

16. The method of claim 14, further comprising the step of cancelling transmit interference signal components comprised in the first and in the second receive signal, which transmit interference signal components originate from the second and from the first transmit signal, respectively, the step of cancelling comprising processing and combining each transmit signal with the corresponding shared frequency receive signal into a first and a second interference-suppressed receive signal.

17. The transceiver apparatus of claim 1, further comprising a transceiver connected to both the first and second antennas, wherein
 the transceiver is configured to use the first antenna to transmit the first transmit signal in the first frequency band, and
 the transceiver is configured to use the second antenna to transmit the second transmit signal in the second frequency band.

18. The transceiver apparatus of claim 1, wherein the transceiver apparatus is further arranged to:
 process the first transmit signal to generate a first cancellation signal;
 process the second transmit signal to generate a second cancellation signal;
 combine the first cancellation signal with the second receive signal to generate an interference suppressed second receive signal; and
 combine the second cancellation signal with the first receive signal to generate an interference suppressed first receive signal.

19. The transceiver apparatus of claim 1, wherein
 the transceiver apparatus is configured to process the first transmit signal to generate the first cancellation signal by filtering the first transmit signal using an adaptive filter, and
 the transceiver apparatus is configured to process the second transmit signal to generate the second cancellation signal by filtering the second transmit signal using an adaptive filter.

20. The method of claim 14, further comprising:
 processing the first transmit signal to generate a first cancellation signal;
 processing the second transmit signal to generate a second cancellation signal;
 combining the first cancellation signal with the second receive signal to generate an interference suppressed second receive signal; and
 combining the second cancellation signal with the first receive signal to generate an interference suppressed first receive signal.

\* \* \* \* \*

UNITED STATES PATENT AND TRADEMARK OFFICE
CERTIFICATE OF CORRECTION

PATENT NO. : 9,641,215 B2
APPLICATION NO. : 14/897112
DATED : May 2, 2017
INVENTOR(S) : Lindgren et al.

It is certified that error appears in the above-identified patent and that said Letters Patent is hereby corrected as shown below:

In the Specification

In Column 1, Lines 11-12, delete "applications" and insert -- application --, therefor.

In Column 1, Line 12, delete "2013 and" and insert -- 2013, and --, therefor.

In Column 2, Line 1, delete "large;" and insert -- large. --, therefor.

In Column 2, Line 34, delete "instance;" and insert -- instance. --, therefor.

In Column 6, Line 64, delete "frequencies;" and insert -- frequencies. --, therefor.

In Column 8, Line 7, delete "second 211 and from the first 221" and insert -- second 221 and from the first 211 --, therefor.

In Column 12, Line 43, delete "band 11" and insert -- band f1 --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*